United States Patent [19]
Clark, Jr. et al.

[11] Patent Number: 5,374,709
[45] Date of Patent: Dec. 20, 1994

[54] PRODUCTION OF GRANULAR POLY(ARYLENE SULFIDE) POLYMERS CONTAINING REDUCED AMOUNTS OF OLIGOMERS

[75] Inventors: Earl Clark, Jr.; Lacey E. Scoggins, both of Bartlesville, Okla.; Glenn F. Kile, Borger, Tex.

[73] Assignee: Phillips Petroleum Company, Bartlesville, Okla.

[21] Appl. No.: 965,833

[22] Filed: Oct. 23, 1992

[51] Int. Cl.$^5$ .............................................. C08G 75/16
[52] U.S. Cl. .................................. 528/499; 528/388; 528/481; 528/487; 528/488; 528/489; 528/492; 528/494
[58] Field of Search ............... 528/499, 489, 481, 487, 528/488, 492, 494, 388

[56] References Cited

U.S. PATENT DOCUMENTS

| | | | |
|---|---|---|---|
| 4,071,509 | 1/1978 | Edmonds, Jr. ......................... | 260/79 |
| 4,748,231 | 5/1988 | Nesheiwat ............................ | 528/486 |
| 4,769,442 | 9/1988 | Iwasaki et al. ....................... | 528/388 |
| 5,098,992 | 3/1992 | Nesheiwat ............................ | 528/486 |
| 5,128,445 | 7/1992 | Scoggins et al. ..................... | 528/492 |

FOREIGN PATENT DOCUMENTS

| | | |
|---|---|---|
| 0240016 | 4/1987 | European Pat. Off. . |
| 0323175 | 12/1988 | European Pat. Off. . |
| 2-102228 | 4/1990 | Japan . |
| 3-6170 | 1/1991 | Japan . |

*Primary Examiner*—Nathan M. Nutter
*Assistant Examiner*—Shelley A. Dodson
*Attorney, Agent, or Firm*—Beverly M. Dollar

[57] ABSTRACT

A method for removing oligomers and non-polymeric impurities from poly(arylene sulfide) polymers and producing the polymers in easily recoverable granular form is provided in which a poly(arylene sulfide) polymer associated with oligomers and non-polymeric impurities is contacted with a solvent, water, and optionally, a base, at a sufficient temperature to substantially dissolve the polymer, oligomers and impurities; then the solution is cooled to a temperature at which the poly(arylene sulfide) precipitates while oligomers and impurities remain in solution, then the precipitated polymer is separated from the solution containing the oligomers and impurities. A polymer product produced by this method is also disclosed.

10 Claims, 3 Drawing Sheets

PRODUCTION OF GRANULAR POLY(ARYLENE SULFIDE) POLYMERS CONTAINING REDUCED AMOUNTS OF OLIGOMERS

BACKGROUND OF THE INVENTION

This invention relates to a method of purifying a poly(arylene sulfide) polymer and the composition produced thereby. More particularly, in a more preferred aspect, this invention pertains to removal of oligomers and non-polymeric impurities from a poly(phenylene sulfide) polymer and the composition produced thereby.

Poly(arylene sulfide) polymers are known in the art and have found wide use due to their desirable thermal and chemical resistance. Poly(arylene sulfide) polymers are useful in the formation of films, fibers, composites and molded parts by a variety of methods known to those of skill in the art.

Oligomers and polymer-by-products in poly(phenylene sulfide) polymer products may contribute to certain processing and final product problems. Problems attributed to high oligomer concentrations in the polymer include mold plate out, die face build up, exhaust duct fouling, bubble formation in molded part, corrosion, injection molding drool and off gassing during injection molding. Solvent extraction methods have been used to remove some of the oligomers from poly(phenylene sulfide) products, but a detrimental oligomer concentration usually remains after extraction. Thus, there still exists a need for an improved oligomer and non-polymeric impurity removal technique.

A disadvantage sometimes associated with the production of poly(arylene sulfide) polymers pertains to the particle size of polymeric particles produced. When the polymer is recovered by a method like that disclosed in U.S. Pat. Nos. 3,800,845 and 3,839,302 referred to as a "flash" process, it is ordinarily in the form of power-like particles having relatively lower bulk densities. Recovery, processing and handling of polymers which have low bulk densities and are in a powder-like form are more difficult. Another problem that has been experienced in the recovery of certain high molecular weight poly(arylene sulfide) polymers is the polymer's tendency to agglomerate into large chunks during solid particle formation which makes recovery of the polymer more difficult.

It would therefore be desirable to have a method of producing a relatively high molecular weight poly(arylene sulfide) polymer having reduced amounts of oligomers and impurities and having an easily recoverable, more desirable granular form.

SUMMARY OF THE INVENTION

An object of this invention is to minimize the oligomers and non-polymeric impurities a poly(arylene sulfide) polymer.

Another object of this invention is to produce a poly(arylene sulfide) polymer having fewer oligomeric impurities and having desirable larger polymer particle size. Another object of this invention is to produce the pure, larger particle size polymer without causing reactor fouling.

In accordance with this invention, a granular poly(arylene sulfide) polymer is subjected to at least a three step process to remove undesirable oligomers and non-polymeric components. First, the poly(arylene sulfide) polymer is contacted with a solvent and water at temperatures sufficient to completely dissolve the poly(arylene sulfide) polymer, oligomers and non-polymeric impurities, thereby forming a solution. Then, the solution is cooled to a temperature sufficient to precipitate the poly(arylene sulfide) polymer but not low enough to cause the precipitation of oligomers and other non-polymeric impurities. Finally, the resulting slurry is subjected to a separation at the elevated temperature to remove the solid purified poly(arylene sulfide) polymer product, thereby removing the liquid oligomers and non-polymeric impurities from the poly(arylene sulfide).

In a preferred embodiment of this invention, the polymer is contacted with a solvent, water and an amount of a base sufficient to prevent the agglomeration of polymer in large chunks in the reactor.

DESCRIPTION OF THE PREFERRED EMBODIMENTS

Figure 1:
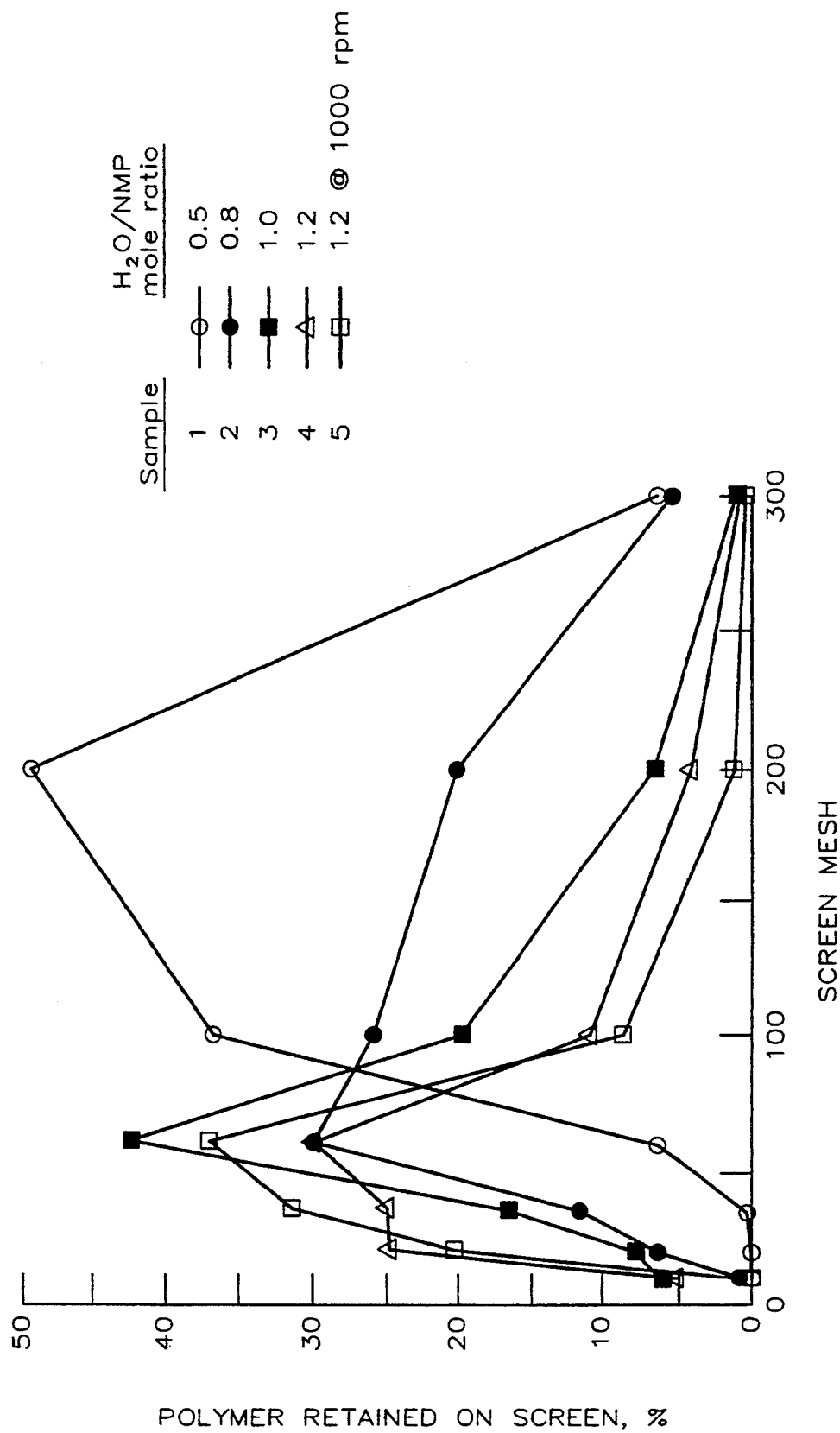
FIG. 1 graphically depicts the effect of the amount of water employed in this invention on particle size of the recovered polymer.

In accordance with this invention, a poly(arylene sulfide) polymer is contacted with a suitable solvent and water, and optionally a base, at temperatures sufficient to dissolve the poly(arylene sulfide) polymer, oligomers and non-polymeric impurities.

The poly(arylene sulfide) polymers useful in this invention. are those prepared according to any method known to those of ordinary skill in the art, such as, for example, those disclosed in U.S. Pat. Nos. 3,354,129, 3,919,177, 4,038,261, 4,038,262, 116,947, 4,282,347 and 4,350,810, which patents are hereby incorporated by reference. The poly(arylene sulfide) polymer is generally prepared by contacting reactants comprising a dihalosubstituted aromatic compound, a sulfur source and a polar organic compound, optionally in the presence of alkali metal carboxylates and/or polyhaloaromatic compounds, under polymerization conditions.

Examples of poly(arylene sulfide) polymers suitable for purposes of this invention include poly(2,4-toluene sulfide), poly(4,4'-biphenylene sulfide) and poly(phenylene sulfide). Because of its availability and desirable properties (such as high chemical resistance, non-flammability, and high strength and hardness) poly(phenylene sulfide) is the presently preferred poly(arylene sulfide) polymer.

During the preparation of the poly(arylene sulfide) polymer, certain by-products and oligomers can be formed. These non-polymeric by-products and oligomers can become associated with the poly(arylene sulfide) polymer during recovery. The term "oligomers" as used herein, is meant to denote compounds containing units contributed by the monomers in numbers less that about 15. Non-polymeric impurities include unreacted monomer and other reaction materials such as alkali metal carboxylates, and the products of side reactions and like materials. The non-polymeric impurities which can be removed by dissolving them in the suitable solvent are not meant to include alkali metal halide produced in the reaction. This material is typically removed during conventional recovery of the poly(arylene sulfide) polymer. If the poly(arylene sulfide) polymer employed in this invention contains such alkali metal halide, it is preferred to remove it as much as is reasonably possible prior to dissolving the poly(arylene sulfide) polymer, oligomers and non-polymeric impurities in the solvent and water. Removal can be effected, for example, by washing the polymer with water, optionally at elevated temperatures.

In an alternative embodiment, the alkali metal halides associated with the polymer can be removed after the poly(arylene sulfide) polymer, oligomers and non-polymeric impurities are dissolved in the suitable solvent but before any appreciable amount of water is added. For this embodiment, the solvent should be chosen such that the alkali metal halides are relatively insoluble in the solvent so that the solid alkali metal halides can easily be separated from the poly(arylene sulfide) polymer containing solution.

Any suitable solvent can be used in this invention. Suitable solvents are those in which the poly(arylene sulfide) polymer, oligomers and non-polymeric impurities can be substantially dissolved. Such solvents should remain liquid at the temperatures and pressures involved. Solvents useful in this invention to dissolve poly(arylene sulfide) polymers and associated oligomers and non-polymeric impurities include, but are not limited to, amides, lactams, sulfones, ethers, and halogenated aromatics. Examples of amides and lactams which may be useful in the present invention include tetramethyl urea, N,N'-ethylenedipyrrolidone, N-methylpyrrolidone, N-ethylpyrrolidone, N-cyclohexylepyrrolidone, caprolactam, N-methylcaprolactam, and hexamethylphosphoramide. Possible sulfones useful as solvents in the present invention include sulfolane, diphenyl sulfone, and chlorinated diphenyl sulfones. Examples of sulfides possibly useful in the present invention are diphenyl sulfide and chlorinated diphenyl sulfides. Ethers which may be useful as solvents in the present invention include diphenyl ether and chlorinated diphenyl ethers. Chloronaphthalene is the preferred halogenated aromatic useful as a solvent in the present invention.

Any suitable amount of solvent may be used to dissolve the poly(arylene sulfide) polymer, oligomers and non-polymeric impurities, however, the concentration of polymer in solution is limited by the filterability of the solution upon cooling.

It is preferred to employ an amount of solvent such that the poly(arylene sulfide) polymer concentration in the solvent is less than about 25 weight percent, based on the weight of the solvent, since polymer precipitation above about 25 weight percent would necessitate the employment of different or additional equipment due to the nature of the mixture; i.e., it is generally in the solid phase rather than a slurry at concentrations above 25 weight percent. The most preferred poly(arylene sulfide) concentration is in the range of about 15 to about 25 weight percent.

The amount of water employed with the solvent to dissolve the poly(arylene sulfide) polymer generally should be in the range of about 0.3 to 1.2 moles water per mole of solvent, preferably 0.5 to 0.8 moles water per mole solvent. Any water associated with the poly(arylene sulfide) polymer or with the base, if employed, should be taken into account when determining the moles of water present.

Any suitable temperature can be used for the step in which the poly(arylene sulfide) polymer, oligomers and non-polymeric impurities are dissolved. The temperature will vary according to which poly(arylene sulfide) polymer and solvent are employed and whether additional compounds are present. For example, the temperature required for complete dissolution of poly(phenylene sulfide) and associated oligomers and non-polymeric impurities in N-methyl-2-pyrrolidone is typically about 185° C. to about 285° C. Generally, temperatures exceeding about 300° C. should be avoided since poly(phenylene sulfide) could begin to degrade and/or the solvent/water mixture could generate pressures which are undesirably high. In addition, it is preferred to agitate the solution in order to further promote dissolution of the polymer, oligomers, and impurities.

A base may optionally be added to prevent the precipitating poly(arylene sulfide) from agglomerating in large chunks. Suitable bases useful in the present invention include, but are not limited to, alkali metal hydroxides and carbonates. The preferred alkali metal base is sodium hydroxide.

The amount of base employed is generally in the range of about 0.02 to about 0.3 moles base per mole of poly(arylene sulfide) polymer repeat unit, preferably 0.05 to 0.1 moles base per mole poly(arylene sulfide) polymer repeat unit.

Once essentially complete dissolution of the solids is attained, agitation, if any, and heating are discontinued. The solution is then cooled at a rate in the range of about 0.5° to 1.2° C. minute.

The solution is cooled to a temperature at which the poly(arylene sulfide) polymer solidifies, but at which the oligomers and other non-polymeric impurities remain in solution. For example, poly(phenylene sulfide) precipitates from N-methyl-2-pyrrolidone and water at temperatures in the range of about 185° C. to about 240° C. As the solution cools, the precipitated polymer is more properly described as being in a slurry in the solvent containing the dissolved oligomers and impurities.

After precipitation of the polymer, cooling of the resulting slurry is discontinued and separation of the solid polymer from the solution is initiated. Slurry temperature is maintained at an elevated temperature during the separation process in order to insure that the dissolved impurities remain in solution.

For poly(phenylene sulfide) polymers, the filtration will generally be performed at a temperature in the range of about 130° to 200° C., preferably 150° to 170° C.

The separation step can be performed in any manner known to those of ordinary skill in the art for separating solids from liquids, such as, for example, filtration or centrifugation. The resultant poly(phenylene sulfide) precipitation may be washed or extracted with solvent to remove remaining minor amounts of oligomers or poly by-product. Preferably at least one solvent wash is performed. The solvent is preferably the solvent used for dissolution of the poly product in the first step of the invention. Preferably the solvent is heated to about 140° to about 200° C. prior to contact with the polymer precipitation. Heated solvent allows more oligomer removal since oligomers will dissolve on the solvent at elevated temperatures.

A further understanding of the present invention and its advantages will be provided by reference to the following examples. The examples are provided merely to illustrate the practice of the invention and should not be read as limiting the scope of the invention or the appended claims in any way. Reasonable variations and modifications, not departing from the essence and spirit of the invention, are contemplated to be within the scope of patent protection desired and sought.

In the following examples, the polyphenylene sulfide (PPS) melt flow rates were determined by the method of ASTM D 1238-86, Procedure B-Automatically Timed Flow Rate Procedure, Condition 316/5.0, modified to use a 5 minute preheat. The values of flow rate are expressed as grams per ten minutes (g/10 min).

Polymer molecular weight determinations were carried out on a specially constructed high temperature gel permeation chromatography instrument connected to a flame ionization detector. Determinations were done in 1-chloronaphthalene at 220° C. Results are reported in terms of the weight average molecular weight (Mw) in units of grams per mole (g/mol) and are based on polystyrene standards.

The relative amounts of volatiles present in polymer samples were measured using a quartz crystal microbalance (QCM). This test involved vaporizing volatile material from a solid PPS sample, collecting the vapors on a water cooled, vibrating quartz crystal, and estimating the amount of condensed material by changes in frequency of the vibrating crystal. A weighed sample of the PPS polymer was placed in the bottom of a heated (290° C.) stainless steel beaker that was covered with a lid containing the vibrating crystal. As vapors condensed on the crystal, the resonance frequency of the crystal decreased in proportion to the amount deposited. Test values are reported in terms of a dimensionless relative number proportional to the change in frequency of the crystal in a 30 minute test time. Lower reported values indicate that the test sample had a lower level of volatiles at the test temperature than samples with higher QCM values.

Polymer particle sizes were determined by sieving the particles with a set of 20.3 cm diameter stainless steel US Standard sieves and a mechanical shaker. Sieve sizes were 20, 35, 60, 100, 200, and 325 mesh with a small sieve number corresponding to a larger opening. A 100 g sample of the polymer was placed on the top screen (coarsest) and the sieve set was shaken for 30 minutes. The weights of polymers retained on each screen were determined and the results were calculated as a percentage of the original polymer weight.

EXAMPLE I

This example demonstrates the reprecipitation of PPS from a mixture of NMP and water using different mole ratios of water to NMP. The PPS was prepared in a 340 liter reactor using aqueous sodium hydroxide (NaOH), aqueous sodium hydrosulfide (NaSH), sodium acetate, N-methyl-2-pyrrolidone (NMP), and p-dichlorobenzene (DCB).

Aqueous NaOH and aqueous NaSH were premixed in a separate heating vessel. The warmed (about 115° C.) liquid mixture was charged with a following NMP flush to the reactor containing NMP and sodium acetate. This mixture was subjected to a dehydration step wherein water plus some NMP were removed from the rector by distillation.

Molten DCB was then charged to the reactor at about 225°-230° C. and the reaction mixture held at about 230° C. for one hour, then at about 264° C. for 2 hours. The reactor contents were transferred to another vessel where reduced pressure conditions caused NMP and other volatiles to be flashed overhead for recovery.

Following the flashing operation, the reaction mixture was washed twice with 300 L of deionized water at ambient temperature, once with 300 L of deionized water at 177° C., and once with 300 L of deionized water containing 150 mL of acetic acid at 177° C. utilizing a PPS slurry mixing tank and then a nylon fabric moving belt filter system to separate the PPS from the wash/rinse liquid. Portions of the wet, filtered PPS polymer were used in the following reprecipitations.

In each run, 750 g of the wet PPS polymer and 1800 g of NMP were added to a 3.8 liter autoclave equipped with a stirrer. The mixture was dehydrated to remove the water and a portion of the NMP. Water was added to each mixture to produce water/NMP mole ratios ranging from 0.5 in run 1 to 1.2 in runs 4 and 5. The mixtures were heated to 265° C. and held for 60 minutes with stirring at 300 rpm for runs of 1 through 4 and 1000 rpm for run 5. After the mixtures had been cooled and filtered while still warm, the recovered solid was rinsed with hot (150° C.) NMP and washed with deionized water to remove NMP. Table I describes the water/NMP ratios and reactor pressures for each reprecipitation run. The polymer samples were dried for evaluation.

TABLE I

| | PPS Reprecipitation | |
|---|---|---|
| Run | $H_2O$/NMP Mole Ratio | Pressure, kPa at 265° C. |
| 1 | 0.5 | 1030 |
| 2 | 0.8 | 1410 |
| 3 | 1.0 | 1720 |
| 4 | 1.2 | 1930 |
| 5 | 1.2[a] | 1930 |

[a]At 1000 rpm.

The dried PPS samples were evaluated for particle size distribution and the results are shown in FIG. 1. The largest particle sizes were obtained with the 1.0 and 1.2 mole ratio of water to NMP. Changes in stirrer rpm from 300 to 1000 made slightly smaller particles.

Although these results only apply directly to relatively small reactors since there is a significant difference in agitation patterns between small and large reactors, they do show that selecting the correct range of water/NMP mole ratios is critical to producing large PPS particles.

EXAMPLE II

The effects of added sodium hydroxide, cooling rate, water/NMP mole ratio on PPS reprecipitation are studies in this example. A series of PPS samples were prepared as described in Example I and then each wet, filtered polymer was reprecipitated as described below.

Figure 2:
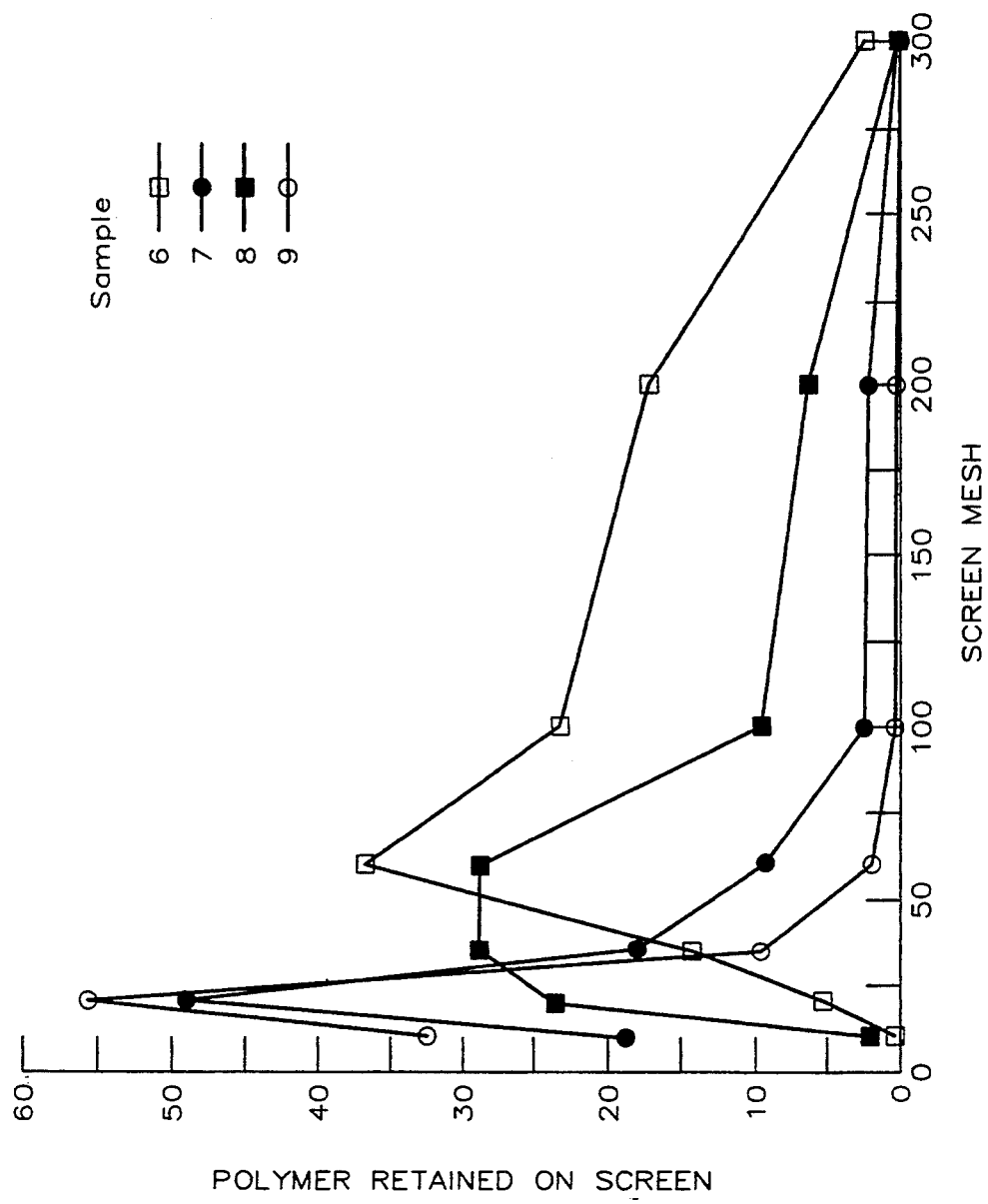
FIG. 2 graphically depicts the effect of added base employed in the invention process on particle size of the recovered polymer.

Table II describes the conditions used in the reprecipitations in runs 6, 7, 8, and 9 as well as the recovered polymer properties. A plot of the particle sizes is shown in FIG. 2.

TABLE II

| | PPS Reprecipitation | | | |
|---|---|---|---|---|
| Polymer | 6 | 7 | 8 | 9 |
| Wet cake, kg | 82.6 | 101.6 | 71.4 | 100 |

TABLE II-continued

| | PPS Reprecipitation | | | |
|---|---|---|---|---|
| Polymer | 6 | 7 | 8 | 9 |
| NMP, kg | 140 | 213 | 140 | 140 |
| Dehyd. Liquid ovhd., kg | 48.6 | 55.8 | 35.8 | 56.7 |
| Water/NMP, mole ratio | 0.5 | 0.83 | 0.8 | 0.8 |
| 50% NaOH, kg | 0 | 9.7 | 4.85 | 2.45 |
| 265° C. Soak time, min | 7 | 60 | 60 | 60 |
| 265° C. Pressure, MPa | 1.57 | 2.25 | 2.07 | 2.09 |
| Cooling time to 149° C., min | 177 | 161 | 169 | 110 |
| Reactor | Clean | Clean | Clean | Fouled |
| Particle size | Very Small | Moderate | Large | Very Large |
| Flow rate, g/10 min | 218 | 199 | 265 | 105 |
| QCM, before reprecipitation | 1.17 | 0.87 | 1.02 | 0.75 |
| QCM, Reprecipitated | 0.5 | 0.41 | 0.46 | 0.05 |
| Polymer recovered, kg | 29 | 23 | 13 | 17 |

Run 6 had no added NaOH, slower cooling and a lower water/NMP ratio. The resulting particles were very small. Run 7 had the highest level of added NaOH, faster cooling, and a high water/NMP ratio. It gave moderate sized particles.

Run 8 had a medium level of NaOH, faster cooling, and a high water/NMP ratio. The PPS particles were large. Run 9 had the lowest level of NaOH, faster cooling, a high water/NMP ratio, and a second cold charge of NMP at 216° C. This treatment gave very large particles, but the reactor was fouled with polymer.

In each run, the volatiles as measured by the QCM test, were lower for the reprecipitated PPS than for the corresponding polymer without the reprecipitation step. Run 6, which was cooled slowly without sodium hydroxide, did result in a clean reactor. However, at more commercially desirable cooling rates sodium hydroxide is beneficial in producing a clean reactor. Invention runs 7 and 8 gave a clean reactor after the precipitation. Run 9, with a second cold charge of NMP at 216° C., resulted in a fouled reactor.

These results show that a water/NMP ratio around 0.8 and the presence of sodium hydroxide successfully reprecipitated PPS to produce large particles at an acceptable cooling rate without having polymer stick to the reactor interior.

EXAMPLE III

This example provides further illustrations of the reprecipitations of this invention. A series of PPS polymers was prepared as described in Example I and each of the wet, filtered products was separately reprecipitated in a 320 liter reactor.

In each run, the wet PPS sample was mixed with 140 kg of NMP and dehydrated to remove the water and a small portion of the NMP. Water was added to adjust the water/NMP mole ratio to the desired level. In all runs except runs 10 and 16, NaOH was also added to the mixture. This mixture was then heated to 265° C. and held with stirring (400 rpm) for the desired mixing time. The mixture was cooled at 500 rpm, filtered warm on a shaker screen, and the solid washed with 177° C. deionized $H_2O$ for 30 minutes, filtered, and dried.

The results of these runs are summarized in Table III. Reprecipitation runs 10 and 16 are comparative runs made without sodium hydroxide and both runs resulted in fouled reactors. The very fine powder produced in run 11 was probably due to the lower molecular weight (shown by the higher flow rate) of the starting polymer. A higher level of water would have produced particles.

Invention runs 12, 13, 14, 15, 17, and 18 used sodium hydroxide to produce PPS particles while leaving the reactor clean. Several different cooling rates were successfully used to cool the reprecipitation mixtures.

TABLE III

| | PPS Reprecipitation | | | | | | | | |
|---|---|---|---|---|---|---|---|---|---|
| Polymer | 10 | 11 | 12 | 13 | 14 | 15 | 16 | 17 | 18 |
| Wet cake, kg | 81.3 | 79.8 | 71.4 | 99.3 | 83.9 | 79.1 | 65.0 | 83.9 | 69.0 |
| Dehyd. Liquid, ovhd. kg | 46.2 | 48.0 | 45.2 | 59.0 | 52.8 | 44.4 | 38.4 | 52.7 | 40.9 |
| Water/NMP, mole ratio | 0.5 | 0.5 | 0.8 | 0.8 | 0.8 | 0.8 | 0.8 | 0.8 | 0.8 |
| NaOH/NMP, mole ratio | 0 | 0.022 | 0.022 | 0.022 | 0.022 | 0.011 | 0 | 0.022 | 0.022 |
| Time at 265° C., min | 63 | 63 | 63 | 74 | 60 | 63 | 60 | 60 | 60 |
| 265° C. Pressure, MPa | 1.56 | 1.53 | 2.00 | 2.01 | 1.97 | 2.05 | 2.04 | 2.05 | 2.12 |
| Cooling time to 104° C., min | 175 | 183 | 192 | 259 | 175 | 183 | 178 | 193 | 189 |
| Particle size | Small | Powder[a] | Small | Small | Large | Large | Large Chunks | Small | Small |
| Flow rate, g/10 min, Before reprecipitation | 193 | 262 | 145 | 141 | 176 | 157 | 187 | — | 139 |
| Reprecipitated | 348 | — | 107 | 128 | 135 | 72 | 155 | 270 | 57 |
| QCM | | | | | | | | | |
| Before reprecipitation | — | — | 1.3 | 1.6 | 1.5 | 1.2 | 1.4 | — | 1.2 |
| Reprecipitated | — | — | 0.3 | 0.3 | 0.3 | 0.3 | 0.3 | 0.2 | 0.2 |
| Wt Recovered, kg | 0 | 0 | 14 | 23 | 18 | 14 | 16 | 25 | 10 |
| Reactor Condition | Fouled | Clean | Clean | Clean | Clean | Clean | Fouled | Clean | Clean |

[a]Very fine material that could not be filtered.

Figure 3:
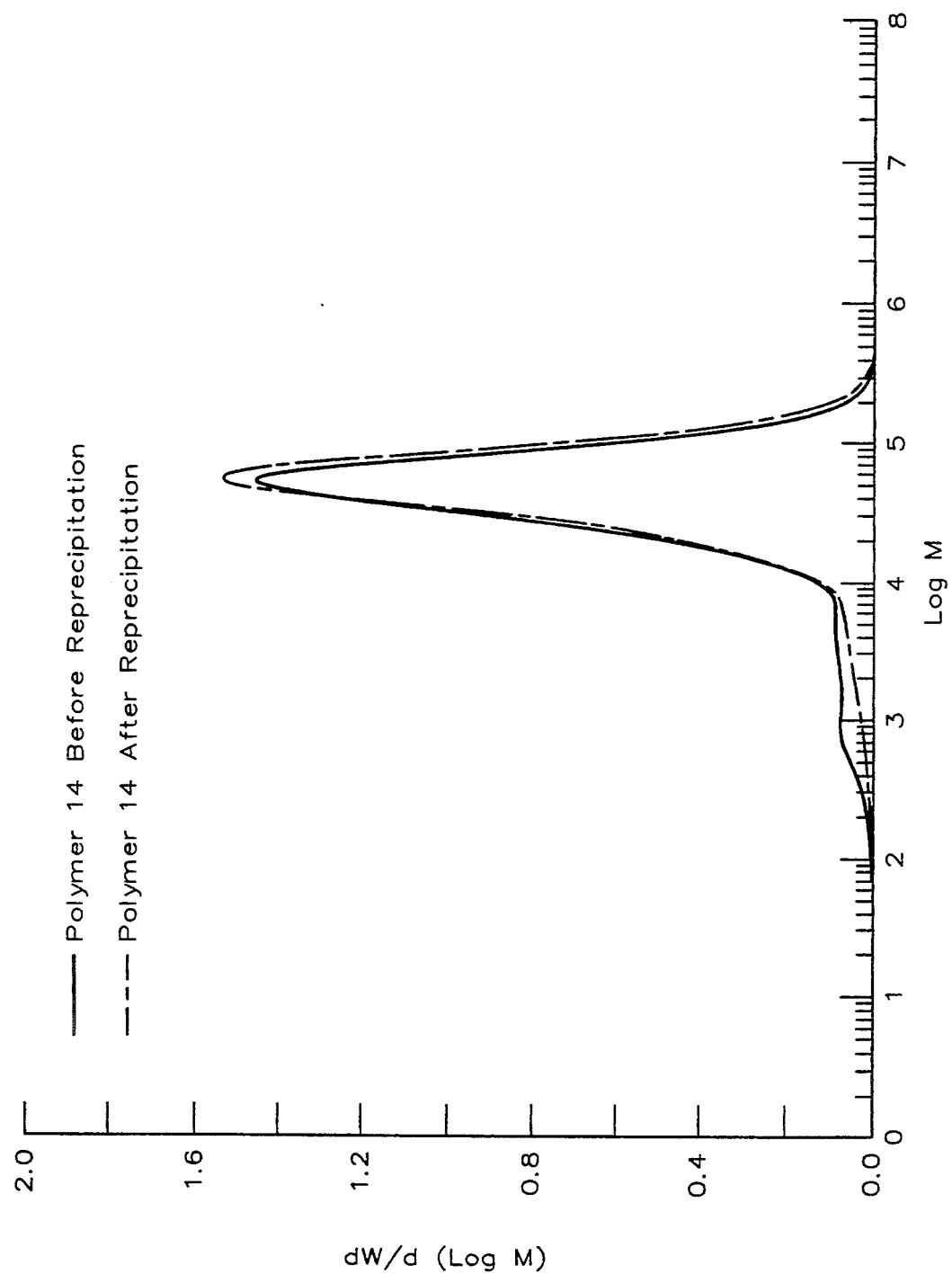
FIG. 3 depicts a comparison of the gel permeation chromatography results for a poly(arylene sulfide) polymer and the same polymer after treatment according to the invention.

The reprecipitation resulted in an increase in the polymer molecular weight. Polymer 14 before reprecipitation had a Mw of 51,000 g/mole and after reprecipitation of 57,000 g/mole. FIG. 3 shows that the reprecipitation removed much of the lower molecular weight portion of the polymer. This is also shown by the decrease in flow rate and QCM volatiles by the reprecipitation (Table III).

EXAMPLE IV

Reprecipitated PPS samples were converted into compounds for injection molding to determine the effect of the reprecipitation on molded part mechanical properties. Compound 19 was made from a commercial PPS sample (PR10 grade) from Phillips 66 Company. Compounds 20 and 21 were made from invention PPS samples 14 and 16 made as described in Example I and reprecipitated from water, NMP, and NaOH as described in Example III.

Each compound was prepared from 38.3 wt % polymer, 40 wt % OC497EE Owens-Corning fiberglass, 1 wt % DHT-4A, a hydrotalcite from Kyowa Chemical Industry, 0.25 wt % TR-161 polyethylene from Phillips Chemical Company, and 0.45 wt % polyetheretherketone (PEEK) 380 P from ICI. Each mixture was dry blended and melt extruded in a 3.8 cm Davis-Standard extruder at temperature settings of 327°–338° C. The extrudate was chopped and injection molded into test specimens on an Arburg ECO injection molder. Each molded part was annealed for two hours at 200° C. before testing. Mechanical properties were determined using ASTM procedure D 638.

The resulting part mechanical properties are listed in Table IV. There is little difference between properties of compounds made from the commercial polymer and the two invention polymers

TABLE IV

| PPS Mechanical Properties | | | |
|---|---|---|---|
| Compound | 19 | 20 | 21 |
| Tensile strength, MPa | 130 | 144 | 143 |
| Elongation, % | 1.0 | 1.14 | 1.17 |
| Izod impact, J/m | | | |
| Notched | 59 | 64 | 59 |
| Unnotched | a | 510 | 500 | aNot determined

That which is claimed is:

1. A method for purifying a poly(arylene sulfide) polymer, wherein oligomers and non-polymeric impurities are removed, which comprises the steps of:
   a) substantially dissolving said poly(arylene sulfide) polymer, oligomers and non-polymeric impurities in a suitable solvent and water in the presence of a base at an elevated temperature to form a solution wherein the molar ratio of said water to said solvent is in the range of 0.3:1 to 1.2:1 and the amount of said base is in the range of about 0.02 to about 0.3 moles base per mole poly(arylene sulfide) polymer repeat unit;
   b) cooling said solution to a relatively lower temperature sufficient to precipitate poly(arylene sulfide) polymer but not low enough to cause the precipitation of said oligomers or impurities; and
   c) separating said precipitated poly(arylene sulfide) polymer from said solution containing said oligomers and impurities at or about said relatively lower temperature, thereby producing said purified poly(arylene sulfide) polymer.

2. A method as recited in claim 1, wherein said solvent is selected from the group consisting of amides, lactams, sulfones, sulfides, ethers and halogenated aromatics.

3. A method as recited in claim 1, wherein said poly(arylene sulfide) is poly(phenylene sulfide).

4. A method as recited in claim 3, wherein said solution is cooled to temperature in the range of about 185° to about 240° C. in step (b).

5. A method as recited in claim 3, wherein said solution is heated to temperatures exceeding about 185° C. in step (a).

6. A method as recited in claim 5, wherein said solvent is N-methyl-2-pyrrolidone.

7. A method as recited in claim 1, wherein said solution comprises less than 5 weight percent poly(arylene sulfide).

8. A poly(arylene sulfide) composition having substantially no oligomer content, wherein said poly(arylene sulfide) composition is produced by a process comprising the steps of:
   a) dissolving said poly(arylene sulfide) polymer in a solvent and water, in the presence of an amount of a base in the range of about 0.02 to about 0.3 moles base per mole poly(arylene sulfide) repeat unit, at an elevated temperature sufficient to substantially completely dissolve poly(arylene sulfide) polymers and oligomers, thereby forming a solution, wherein the molar ratio of water to said solvent is in the range of 0.3:1 to 1.2:1;
   b) cooling said solution to a second, relatively lower temperature sufficient to precipitate poly(arylene sulfide) polymer but not low enough to cause oligomer precipitation; and
   c) separating said precipitated poly(arylene sulfide) polymer from said solution containing oligomers at or about said second temperature, thereby removing substantially all oligomers from said poly(arylene sulfide) polymer.

9. A method as recited in claim 1, wherein said base is selected from the group consisting of alkali metal hydroxides, alakli metal carbonates and mixtures thereof.

10. A method as recited in claim 1, wherein said base is sodium hydroxide.

* * * * *